US010528031B2

United States Patent
Kumar et al.

(10) Patent No.: US 10,528,031 B2
(45) Date of Patent: Jan. 7, 2020

(54) SYSTEMS AND METHODS FOR REMOTE MANUFACTURING OF MEDICAL DEVICES

(71) Applicant: Biomet Manufacturing, LLC, Warsaw, IN (US)

(72) Inventors: Mukesh Kumar, Warsaw, IN (US); Jacy C. Hoeppner, Warsaw, IN (US); Konstantin Caploon, Montclair, NJ (US)

(73) Assignee: Biomet Manufacturing, LLC, Warsaw, IN (US)

( * ) Notice: Subject to any disclaimer, the term of this patent is extended or adjusted under 35 U.S.C. 154(b) by 131 days.

(21) Appl. No.: 15/688,378

(22) Filed: Aug. 28, 2017

(65) Prior Publication Data

US 2018/0046166 A1    Feb. 15, 2018

Related U.S. Application Data

(63) Continuation of application No. 13/837,662, filed on Mar. 15, 2013, now Pat. No. 9,778,648.

(51) Int. Cl.
*G05B 19/4097* (2006.01)

(52) U.S. Cl.
CPC .......... *G05B 19/4097* (2013.01); *Y02P 80/40* (2015.11)

(58) Field of Classification Search
CPC .................. G05B 19/4097; Y02P 80/40
See application file for complete search history.

(56) References Cited

U.S. PATENT DOCUMENTS

| 6,772,026 B2* | 8/2004 | Bradbury ............... G16H 50/50 700/98 |
| 9,778,648 B2 | 10/2017 | Kumar et al. |
| 2007/0162305 A1 | 7/2007 | Miller |
| 2008/0114213 A1* | 5/2008 | Bagan .................. A61B 5/0002 600/300 |
| 2008/0261165 A1* | 10/2008 | Steingart ............ A61C 13/0004 433/24 |
| 2009/0254367 A1 | 10/2009 | Belcher et al. |
| 2011/0071230 A1* | 3/2011 | Ji .............................. A61L 2/04 521/47 |
| 2014/0065194 A1* | 3/2014 | Yoo ........................ B33Y 10/00 424/400 |

(Continued)

OTHER PUBLICATIONS

"U.S. Appl. No. 13/837,662, Examiner Interview Summary dated Sep. 21, 2016", 2 pgs.

(Continued)

*Primary Examiner* — Yuhui R Pan
(74) *Attorney, Agent, or Firm* — Schwegman Lundberg & Woessner, P.A.

(57) ABSTRACT

A system and method for remote manufacturing of medical devices are provided. The system can be installed at a facility (e.g., at a hospital or other medical facility), and includes a remote manufacturing unit (RMU) that allows for customized, rapid fabrication of medical devices at the medical facility using suitable manufacturing techniques such as three-dimensional (3D) printing, additive manufacturing, subtractive manufacturing, etc. The RMU can communicate with a computer system which presents a healthcare professional with a digital catalog of medical products, and allows the healthcare professional to select and customize a desired device to be manufactured at the facility.

21 Claims, 11 Drawing Sheets

(56) References Cited

U.S. PATENT DOCUMENTS

2014/0277659 A1    9/2014  Kumar et al.
2015/0165690 A1*  6/2015  Tow ...................... B33Y 80/00
                                                                   700/119

OTHER PUBLICATIONS

"U.S. Appl. No. 13/837,662, Final Office Action dated Feb. 25, 2016", 22 pgs.
"U.S. Appl. No. 13/837,662, Final Office Action dated Mar. 15, 2017", 26 pgs.
"U.S. Appl. No. 13/837,662, Non Final Office Action dated Jul. 27, 2015", 25 pgs.
"U.S. Appl. No. 13/837,662, Non Final Office Action dated Nov. 21, 2016", 25 pgs.
"U.S. Appl. No. 13/837,662, Non Final Office Action dated Nov. 23, 2015", 22 pgs.
"U.S. Appl. No. 13/837,662, Notice of Allowance dated Jun. 1, 2017", 10 pgs.
"U.S. Appl. No. 13/837,662, Response filed Feb. 11, 2016 to Non Final Office Action dated Nov. 23, 2015", 11 pgs.
"U.S. Appl. No. 13/837,662, Response filed Feb. 20, 2017 to Non Final Office Action dated Nov. 21, 2016", 19 pgs.
"U.S. Appl. No. 13/837,662, Response filed May 15, 2017 to Final Office Action dated Mar. 15, 2017", 14 pgs.
"U.S. Appl. No. 13/837,662, Response filed Aug. 24, 2016 to Final Office Action dated Feb. 25, 2016", 11 pgs.
"U.S. Appl. No. 13/837,662, Response filed Nov. 3, 2015 to Non Final Office Action dated Jul. 27, 2015", 11 pgs.

* cited by examiner

SYSTEMS AND METHODS FOR REMOTE MANUFACTURING OF MEDICAL DEVICES

BACKGROUND

Field of the Invention

The present invention relates to the manufacturing of medical devices. More particularly, the present invention relates to systems and methods for remote manufacturing of medical devices.

Related Art

In the medical device industry, rapid design and fabrication of components is paramount. Not only must products be manufactured in accordance with stringent standards, they must also be manufactured sufficiently quickly to meet customer demands. Remote manufacturing of medical devices has been explored in the orthopedics space, but has met with limited success. In the past, several factors contributed to the limited success of such efforts, but implant design issues remain the largest obstacle.

In the mechanical engineering space, robust technologies exist and are being developed which allow for the rapid prototyping and manufacturing of components, such as three-dimensional (3D) printing of components, interchangeably referred to as additive manufacturing, and other techniques. While these technologies are finding use in various fields of endeavor, to date, there has been limited success applying such technologies to the fabrication of medical components. Manufacturing of such devices has several advantages over traditional medical device manufacturing methods, including, but not limited to, reduction in cost, capability for customization, unique manufacturing capabilities, reduction in the number of machines required to manufacture a device, and reduction in human resources required to manufacture a device.

It would also be beneficial to manufacture medical devices at remote facilities, including but not limited to medical facilities, using the foregoing techniques. By providing the capability to remotely manufacture medical devices at remote locations, further advantages could be realized, including reduction in shipping costs, reduction in corporation inventory, more potential for customization of medical devices, and reduction in corporation manufacturing equipment.

Accordingly, it would be desirable to provide systems and methods for remote manufacturing of medical devices which address the foregoing needs.

SUMMARY

The present disclosure relates to systems and methods for remote manufacturing of medical devices. One such system can be installed at a medical facility (e.g., at a hospital), and includes a remote manufacturing unit (RMU) that allows for customized, rapid fabrication of medical devices at the medical facility using suitable manufacturing techniques such as additive manufacturing, subtractive manufacturing, etc. The RMU can communicate with a kiosk-type computer system installed at the medical facility which presents a healthcare professional with a digital catalog of medical products, and allows the healthcare professional to select and customize a desired device to be manufactured at the facility. The kiosk can also display a model of the device to be fabricated, allowing the healthcare professional to customize various parameters of the device prior to fabrication. The same functionality provided by the kiosk computer can also be provided on a portable computing device in communication with the system, such as a laptop computer, personal computer, tablet computer, smart phone, or other type of computing device, allowing healthcare professionals at various locations to access the system and select/specify devices to be manufactured at a medical facility. A central control system could also be provided, which controls manufacturing processes carried out by multiple RMUs at various locations, and which allows for remote quality control/inspection by personnel remote from the medical facility. The system can also communicate with a hospital information management system to update patient records, schedule surgeries, and process billing relating to manufacturing of medical devices.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to systems and methods for remote manufacturing of medical devices, as discussed in detail below in connection with FIGS. 1-11.

Figure 1:
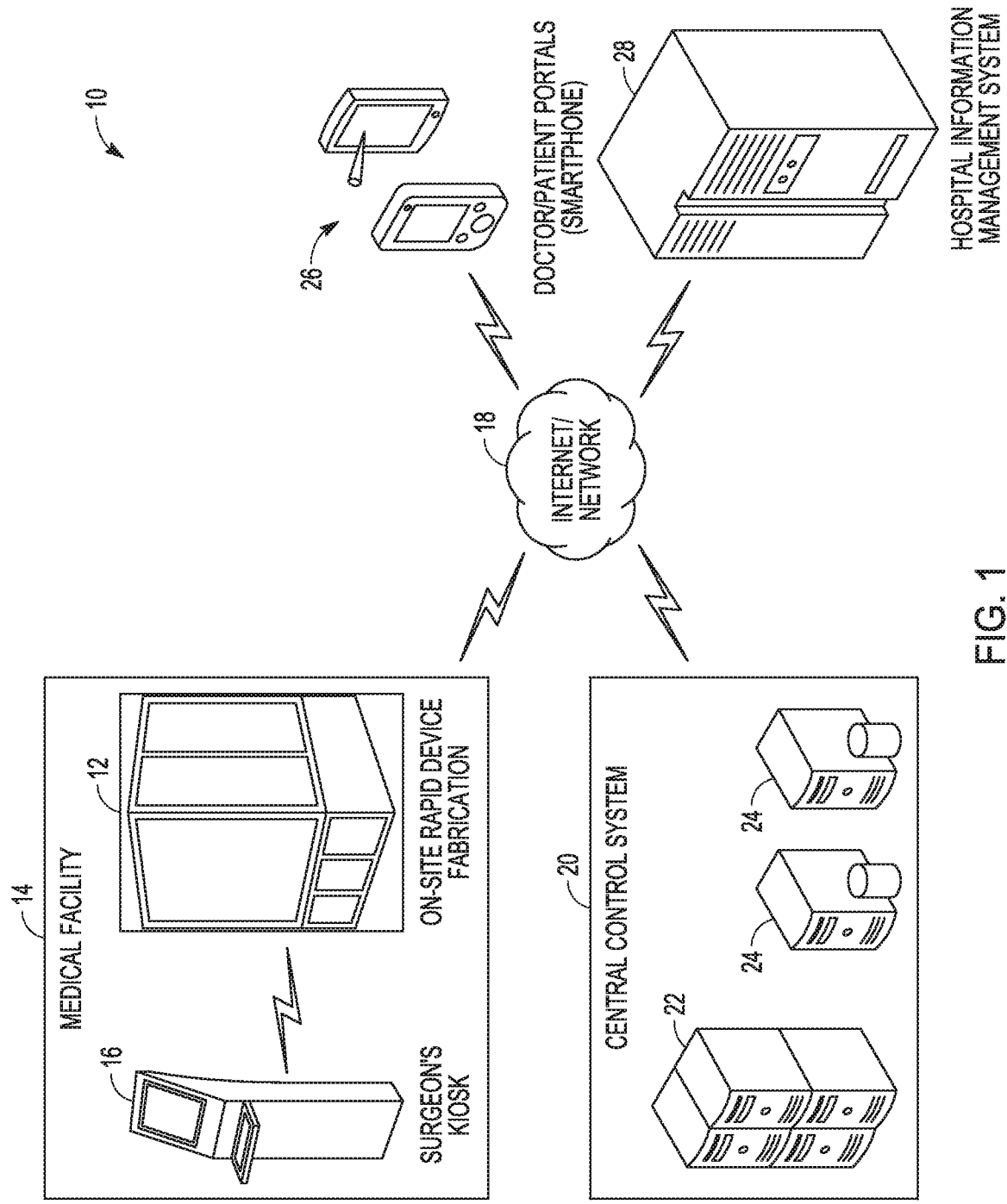
FIG. 1 is a diagram showing a remote manufacturing system of the present invention for manufacturing medical devices at a medical facility.

FIG. 1 is a diagram illustrating a system 10 according to the present disclosure for remote manufacturing of medical devices. The system 10 includes a remote manufacturing unit (RMU) 12 installed at a medical facility 14 (e.g., at a hospital) which allows for on-demand manufacturing of medical devices at the facility 14, such as orthopedic implants (e.g., hip implants, knee implants, etc.), surgical instrumentation to be used by a surgeon to install implants, and other medical devices. As will be discussed in greater detail below, the RMU 12 includes a number of subsystems which allow for rapid, on-site manufacturing of devices and instrumentation at the medical facility 14 using suitable manufacturing techniques such as additive manufacturing, subtractive manufacturing, etc.

Optionally, a computer kiosk 16 could be provided at the facility 14 for allowing a user, such a surgeon, to browse through a digital catalog of medical implants and/or instrumentation, to select desired devices to be fabricated, to customize such devices, and to order such devices and schedule them for manufacturing at the medical facility 14 by the RMU 12. The kiosk 16 could include a touch-screen user interface for allowing simple and convenient user interaction, a trackball, and/or other suitable user input devices. The kiosk 16 is in communication with the RMU 12 (e.g., by a wired or wireless communication network at the facility 14). Additionally, the RMU 12 and the kiosk 16 could both be in communication with a central control system 20 via a network 18 such as the Internet. Additionally, the RMU 12 and the kiosk 16 could be in communication with one or more mobile computing devices operated by doctors and/or patients, such as smart phones 26, and the kiosk 16 could be in communication with a hospital information management system 28. The smart phones 16 could include any type of smart phone such as, but not limited to, an APPLE IPHONE, or any other type of smart phone such as, but not limited to, phones operating the DROID operating system, etc.

The digital catalog of medical devices can be accessed at the kiosk 16, and it can also be accessed using one or more of the smart phones 26 (e.g., using a web browser or a software application ("app") installed on the smart phones 26). Moreover, the digital catalog can be accessed using a computer having access to the network 18 (such as a personal computer, laptop computer, tablet computer (e.g., APPLE IPAD), etc.). As with the kiosk 16, a doctor can use a smart phone 26 to select a medical device to be manufactured, customize the device, and specify a desired time for manufacturing the device at the facility 14. The digital catalog can be hosted on one or more remote servers, such as servers 24 of the control system 20, and can be accessed by the kiosk 16 and the smart phones 26. Alternatively, the digital catalog can be installed on the kiosk 16 and/or the smart phones 26, and periodically updated.

The control system 20 includes one or more servers 22 for remotely monitoring and controlling fabrication of medical devices by the RMU 12, and allows for remote control and management of multiple RMUs located at different locations, thereby providing a remotely-controlled, manufacturing network that can extend across multiple locations, e.g., at multiple medical facilities. Also, as discussed in greater detail below, the control system 20 maintains records of manufacturing performed by the RMU 12, manufacturing deviations requiring review, such as by a human operator (e.g., by a product designer, engineer, etc.) or otherwise, and for periodically performing calibration of the RMU 12. The servers 24 could provide a central repository or store of medical device designs that can be updated in real time and accessed via the digital catalog.

Optionally, communication with a hospital information management system 28 could be provided so that access to patient information, billing information, and patient surgery schedules is provided to the system 10. This allows the system 10 to coordinate manufacturing of devices by the RMU 12 to accommodate surgery schedules, to allocate devices to patient records, and to process patient billing associated with fabricated medical devices.

Figure 2:
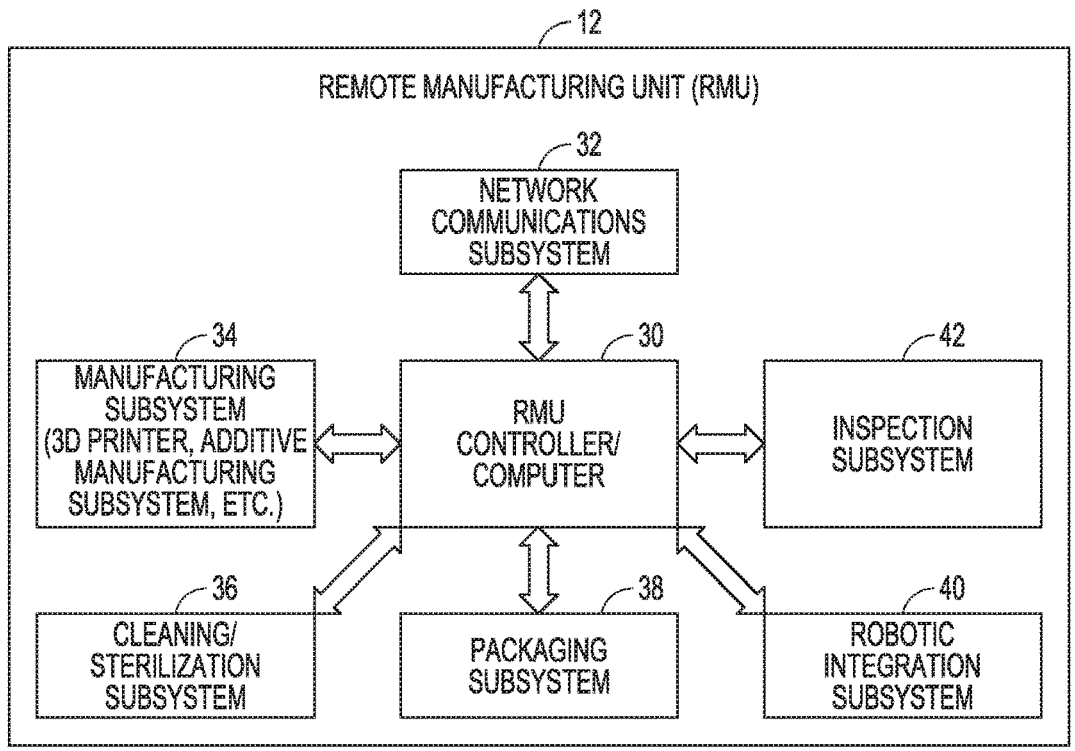
FIG. 2 is a diagram showing hardware components of the remote manufacturing unit of FIG. 1 in greater detail.

FIG. 2 is a diagram showing hardware components of the RMU 12 of FIG. 1 in greater detail. The RMU 12 includes a controller 30 and a number of sub-systems 32-40 which perform various functions associated with manufacturing of a desired medical device at a remote facility such as a medical facility. The controller 30 and sub-systems 32-40 could be provided within a single housing of the RMU 12, or they could be provided separately but interconnected to each other. The RMU controller 30 is a specially-programmed, general purpose computer system (e.g., an embedded computer system) which controls all aspects of operation of the RMU 12, including overall control for fabrication, inspection, cleaning/sterilization, and packaging functions performed by the RMU 12. The RMU controller 30 communicates with and controls each of the sub-systems 34-42, discussed in detail below.

The RMU controller 30 communicates with a network communication subsystem 32, which permits communication between the RMU 12 and one or more external systems, such as the kiosk 16, the central control system 20, one or more of the smart phones 26, and/or the hospital information management system 28. The network communications subsystem 32 could be a wired or wireless network communications subsystem, such as a wired or wireless Ethernet transceiver, and allows the RMU 12 to receive external information such as commands and/or instruction files for fabricating desired medical devices, as well as to transmit information to the kiosk 16, the central control system 20, and/or the smart phones 26 such as status information regarding fabrication processes being carried out by the RMU 12, alert notifications, request for calibration of the RMU 12, etc.

The RMU 12 includes a manufacturing subsystem 34 in communication with the RMU controller 30, which allows for on-site (e.g., at a medical facility) manufacturing of medical devices using suitable fabrication techniques. Such techniques include, but are not limited to, additive manufacturing, subtractive manufacturing, and any other suitable techniques. The manufacturing subsystem 34 is controlled by the RMU controller 30, and instructed by the RMU controller 30 to manufacture desired medical devices using information received by the RMU controller 30 via the network communications subsystem 32. Devices can be fabricated by the manufacturing subsystem 34 using any suitable materials, such as, but not limited to, polymeric materials (e.g., polyetherketoneketone (PEKK), etc.), metallic alloys (e.g., titanium, stainless steel, cobalt-chromium, etc.), or other suitable materials. The manufacturing subsystem 34 can manufacture medical devices of various types, including, but not limited to, implants (orthopedic, spinal, trauma, microfixation, etc.) and instrumentation (retractors, inserters, trials, etc.)

The RMU 12 also optionally includes a cleaning/sterilization subsystem 36 which performs initial and final cleaning of devices manufactured by the manufacturing subsystem 36, as well as passivation and sterilization of such devices. An optional packaging subsystem 38 is also provided in the RMU 12, and receives final (sterilized) devices from the cleaning/sterilization subsystem 36 and packages same for distribution to an operating room or other location within the medical facility. The packaging subsystem 38 could deliver the completed package to a materials distribution system within the medical facility, such as a pneumatic tube system, an electric track vehicle (ETV) system within the medical facility, etc., so that the completed package can be automatically delivered to a desired location (e.g., operating room) within the medical facility.

The RMU 12 also optionally includes a robotic integration subsystem 40 and an inspection subsystem 42. The robotic integration subsystem 40 allows for automatic (robotic) physical transfer of a medical device from the manufacturing subsystem 34, to the inspection subsystem 42 and, if the device passes inspection, thereafter to the cleaning subsystem 36 and the packaging subsystem 38. The inspection subsystem 42 inspects devices manufactured by the manufacturing subsystem 34, using any suitable inspection technique such as non-contact (e.g., laser) scanning, or other technique(s). If the fabricated device does not pass inspection standards, the inspection subsystem 42 communicates an alert to the RMU controller 30, and the RMU controller 30 then transmits the alert to the central control system 20 for intervention and handling of the issue, such as by a quality control engineer or other personnel, as will be discussed in greater detail below.

As noted above, each of the components 30-42 could be provided within a single equipment housing of the RMU 12. Preferably, such a housing provides a sterile environment in which all fabrication processes occur. Of course, separate housings could be provided for each of the components 30-42 shown in FIG. 2, if desired. Further, each of the components 30-42 could communicate using a common communications bus interconnecting the components 30-42, such as a controller area network (CAN), a serial network (e.g., RS-485), or any other suitable type of communications network.

FIGS. 3A-3E are screenshots showing user interface screens generated by the system for allowing a user to browse through a digital catalog of medical devices, to select a desired device for fabrication at a medical facility, and for customizing a device prior to fabrication. The screens generated by the system provide a rich, interactive environment for use by a healthcare professional for specifying, customizing, and submitting device orders for subsequent manufacture of such devices on-site, such as at a medical facility by the RMU 12 of FIGS. 1-2. The screens discussed herein could be displayed by the kiosk 16 of FIG. 1, as well as by one or more of the smart phones 26 shown in FIG. 1 (e.g., using a software "app" installed on the smart phones 26) or using any other suitable type of computing device capable of communicating via the network 18 of FIG. 1, such as a desktop computer, a laptop computer, tablet computer, etc. Together, the screens shown in FIGS. 3A-3E provide a simple, easy-to-use digital catalog that a healthcare professional such as a doctor, surgeon, etc., can use at any desired location in order to order and/or customize medical devices to be manufactured on site at a remote facility, such as a medical facility.

Figure 3A:
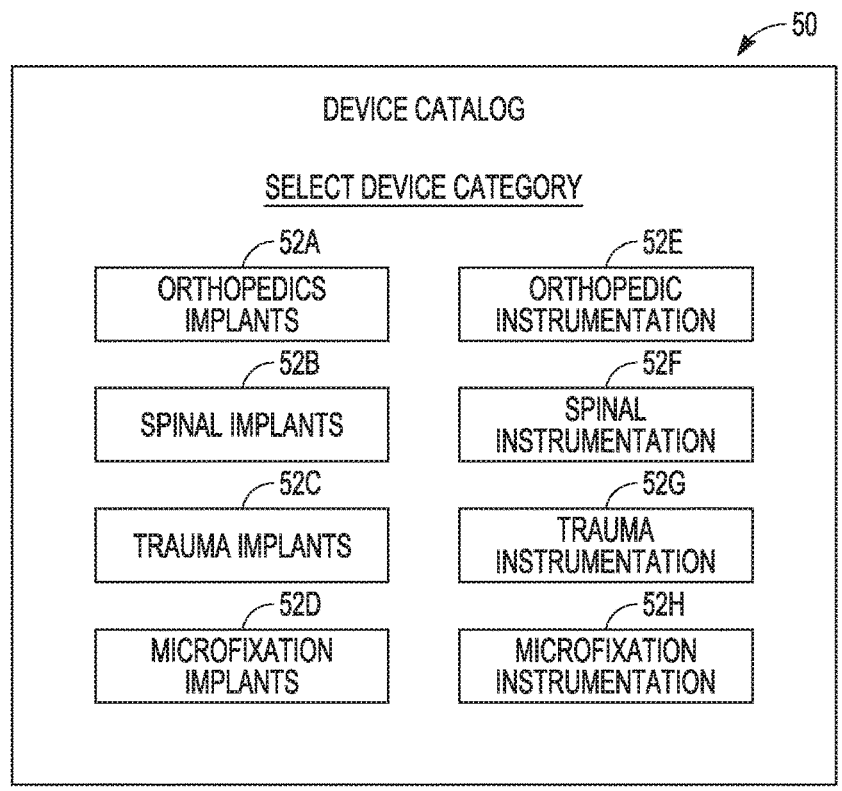
FIGS. 3A-3E are screenshots showing user interface screens generated by the system for allowing a user to browse through a digital catalog of medical devices, to select a desired device for fabrication at a medical facility, and for customizing a device prior to fabrication.

FIG. 3A is a screenshot showing an initial screen 50 generated by the system. The screen 50 allows a user to select from a plethora of pre-defined device categories in the digital catalog, in order to select a desired device to be fabricated. As shown, a plurality of "buttons" 52a-52h could be provided, and the user can select a desired product category by touching or clicking on the corresponding button. As shown, the buttons 52a-52h could allow the user to select from one or more product categories, including, but not limited to, orthopedics implants, spinal implants, trauma implants, microfixation implants, orthopedic instrumentation, spinal instrumentation, trauma instrumentation, and/or other types of product categories.

Figure 3B:
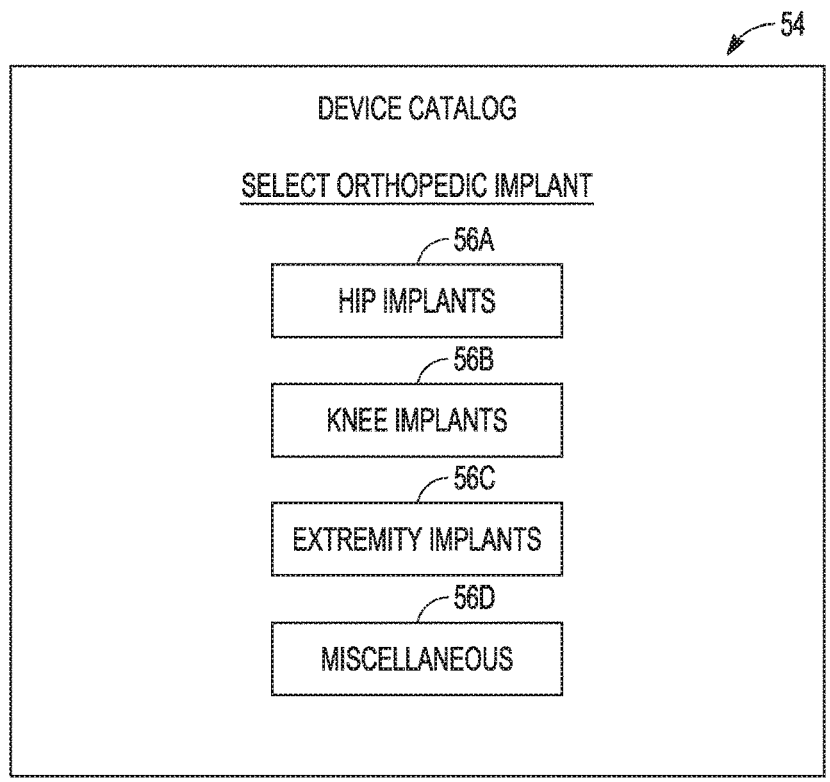

FIG. 3B is a screenshot showing a second screen 54 generated by the system. The screen 54 is displayed when the user selects the orthopedic implants product category of FIG. 3A by clicking on the button 52a. As can be seen, the screen 54 allows the user to select from a plurality of orthopedic implants by clicking on one of the buttons 56a-56d. The user can select a hip implant, a knee implant, an extremity implant, or another (miscellaneous) type of implant.

Figure 3C:
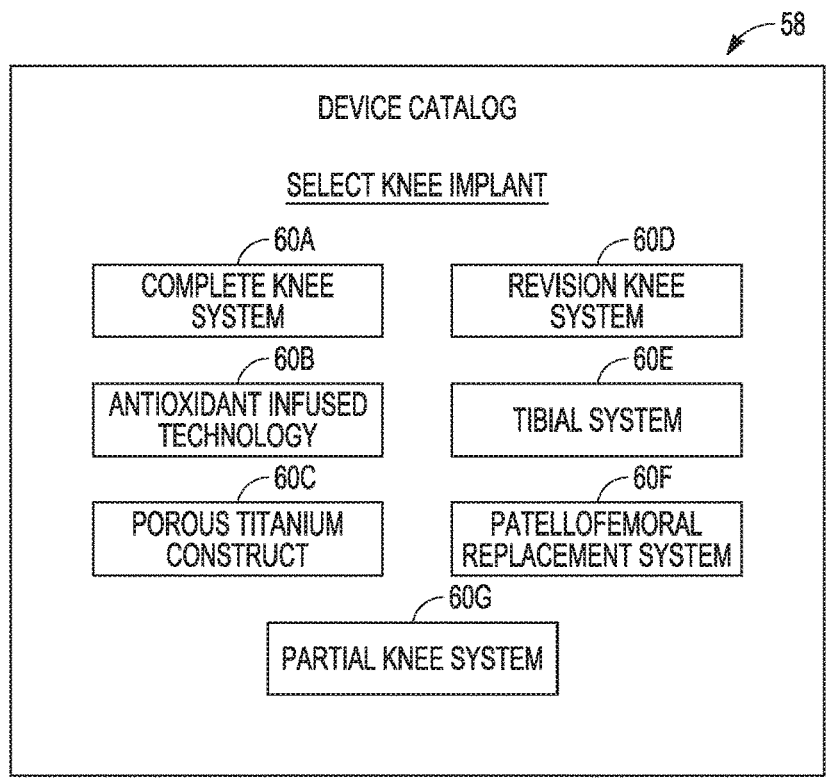

FIG. 3C is a screenshot showing a third screen 58 generated by the system. The screen 58 is displayed when the user selects the "Knee Implants" button 56b of FIG. 3B. As can be seen, the screen 58 allows a user to select a desired type of knee implant to be fabricated by clicking on one of the buttons 60a-60g. Examples of the types of knee implants that could be fabricated at the medical facility include, but are not limited to, a complete knee system, an antioxidant infused knee implant, a porous titanium construct, a revision knee system, a tibial system, a patellofemoral replacement system, and/or a partial knee system.

Figure 3D:
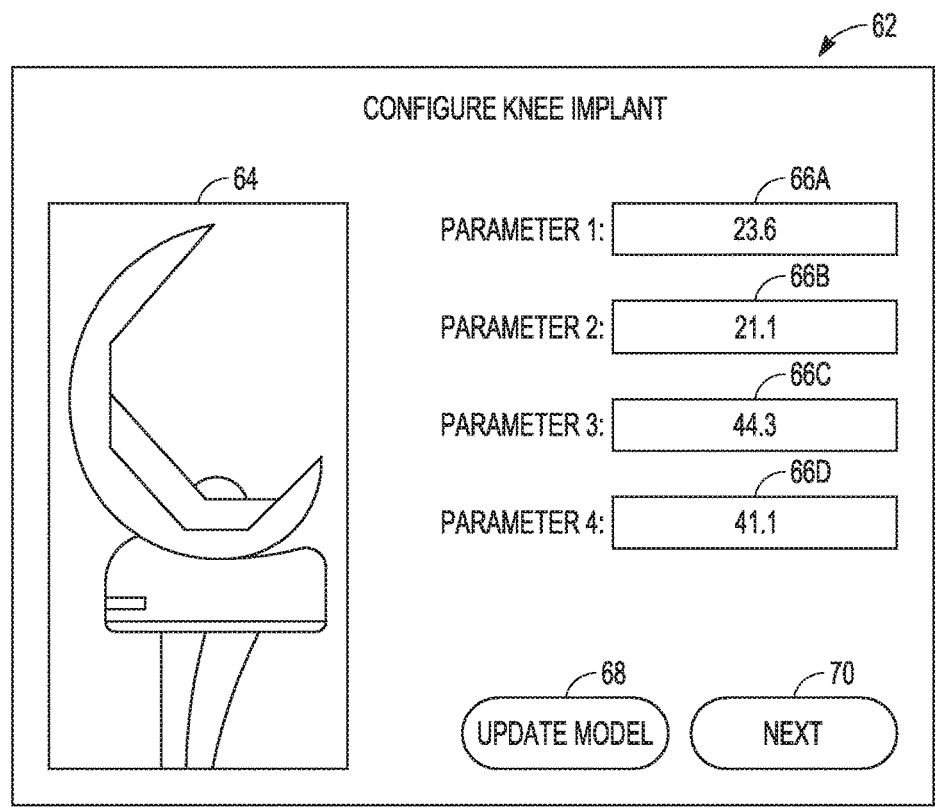

FIG. 3D is a screenshot showing a user interface screen 62 generated by the system, for allowing a healthcare professional to customize a desired implant for fabrication by the system. The screen 62 displays a two- or three-dimensional model 64 of the device to be fabricated (in this case, a total knee replacement as shown in FIG. 62). The model 64 can be updated as desired by the healthcare professional using one or more parameter adjustment fields 66a-66d. Parameters that can be updated include, but are not limited to, dimensions of the device to be fabricated, materials, etc. When the desired parameters have been updated, the user can click on the "Update Model" button 68, whereupon the model of the device to be fabricated is updated, and the updates are displayed in the model 64 so that the operator can visualize the updates requested. When the desired updates have been made, the user can click on the "Next" button 70.

Figure 3E:
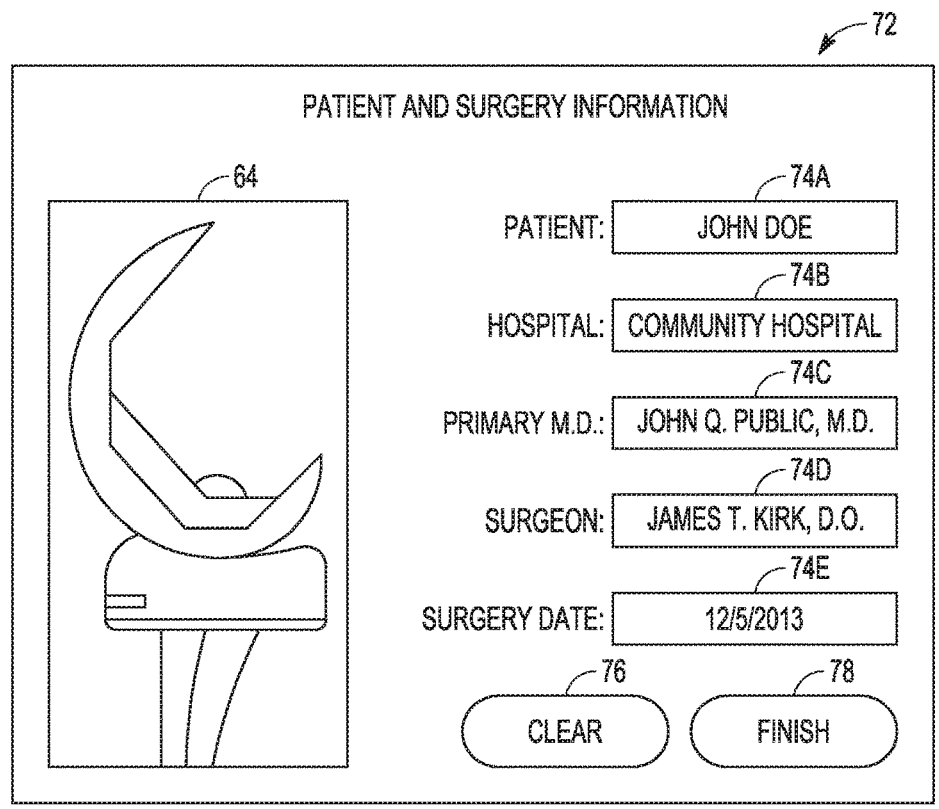

FIG. 3E is a screenshot showing a user interface screen 72 generated by the system. In this screen, the healthcare professional can enter information about the patient, and can also schedule a desired surgery date. Various data entry fields 74a-74e can be provided for entering information including, but not limited to, patient name (field 74a), hospital (field 74b) at which the device is to be fabricated and/or at which surgery is to take place, name of the patient's primary doctor (field 74c), name of the surgeon performing the surgery using the device to be fabricated (field 74d), and scheduled surgery date 74e. The system 10 can communicate this information to a hospital information management system (such as the system 28 of FIG. 1) so that the patient's hospital records are updated and so that the surgery is scheduled with the hospital. The user can click on the "Clear" button 76 to clear the fields and to re-enter information, if desired. The "Finish" button 78 can be clicked by the user when the patient and surgery information has been entered.

Figure 4:
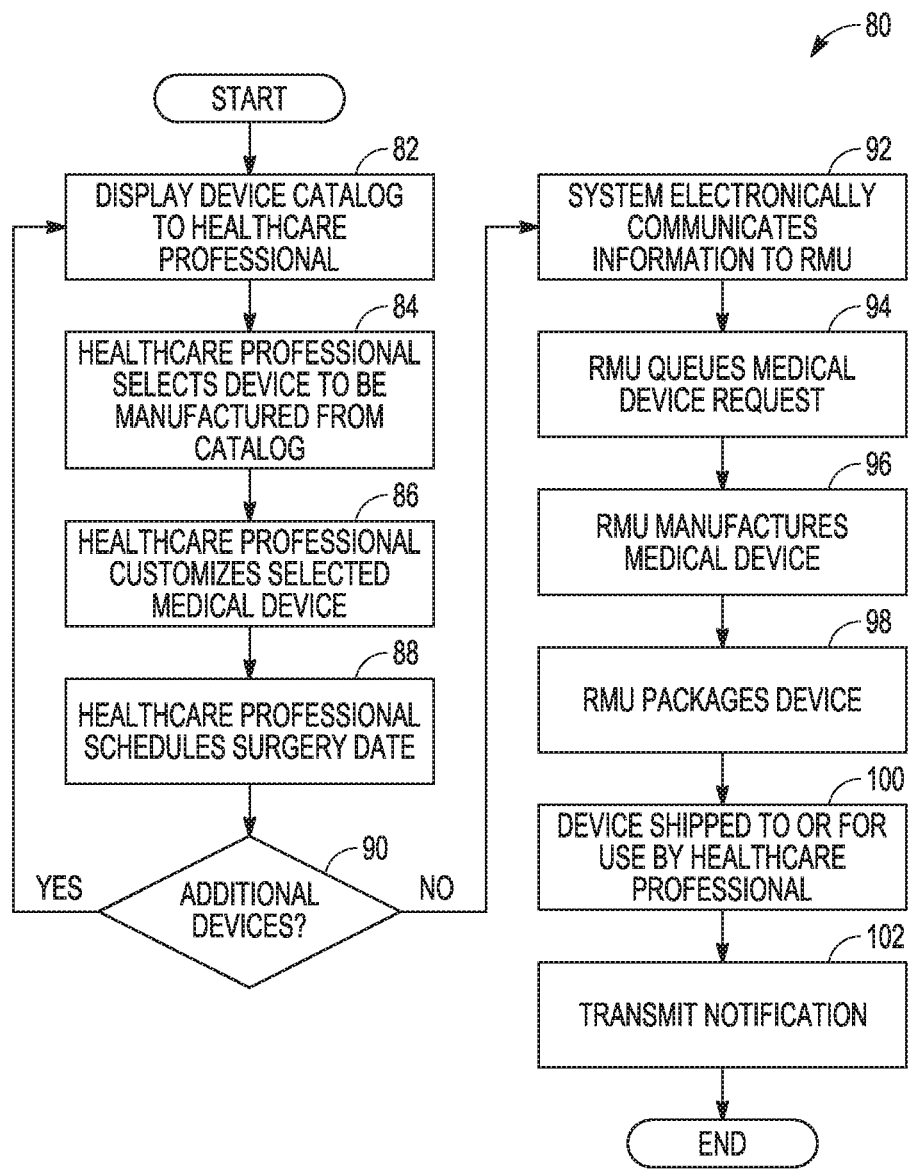
FIG. 4 is a flowchart showing processing steps carried out by the system for fabricating a medical device at a medical facility.

FIG. 4 is a flowchart showing processing steps 80 carried out by the system for allowing a healthcare professional to browse through the digital device catalog of the system, select a desired medical device for fabrication at a facility (e.g., at a hospital), customize the device, and to fabricate the device at a facility using the RMU of the system. Beginning in step 82, the system displays the device catalog to a healthcare professional. The catalog could be displayed using the kiosk 16 or one or more of the smart phones 26 of FIG. 1, or using a computing device in communication with the network 18, such as a personal computer having a web browser, laptop computer, or tablet computer. In step 84, the healthcare professional selects a device to be manufactured from the catalog, and in step 86, the healthcare professional customizes the selected device, e.g., as discussed above in connection with FIGS. 3A-3D. Then, once the device has been customized, step 88 occurs, wherein the healthcare professional schedules a surgery date for a patient using the system (e.g., as discussed above in connection with FIG. 3E). In step 90, a determination is made as to whether additional devices are to be selected/customized by the healthcare professional (e.g., one or more instruments to be fabricated for use in installing a medical device). If so, processing returns to step 82 so that additional devices can be fabricated; otherwise, control passes to step 92.

In step 92, the system electronically communicates information about the device to be fabricated to the RMU 12. Then, in step 94, the RMU queues the medical device request so that fabrication of the device occurs at an appropriate time, e.g., in sufficient time so that the device is ready for use at on the scheduled surgery date. In step 96, after queuing, the RMU manufactures the device at the medical facility. In step 98, once the device has been fabricated by the RMU, it is packaged. Then, in step 100, the device is shipped to an operating room (OR) or other desired location within the medical facility for use by the healthcare professional, e.g., during an operation scheduled by the healthcare professional. Finally, in step 102, a notification is transmitted by the RMU to the central control system 20 of FIG. 1, indicating that the device was successfully manufactured.

Figure 5:
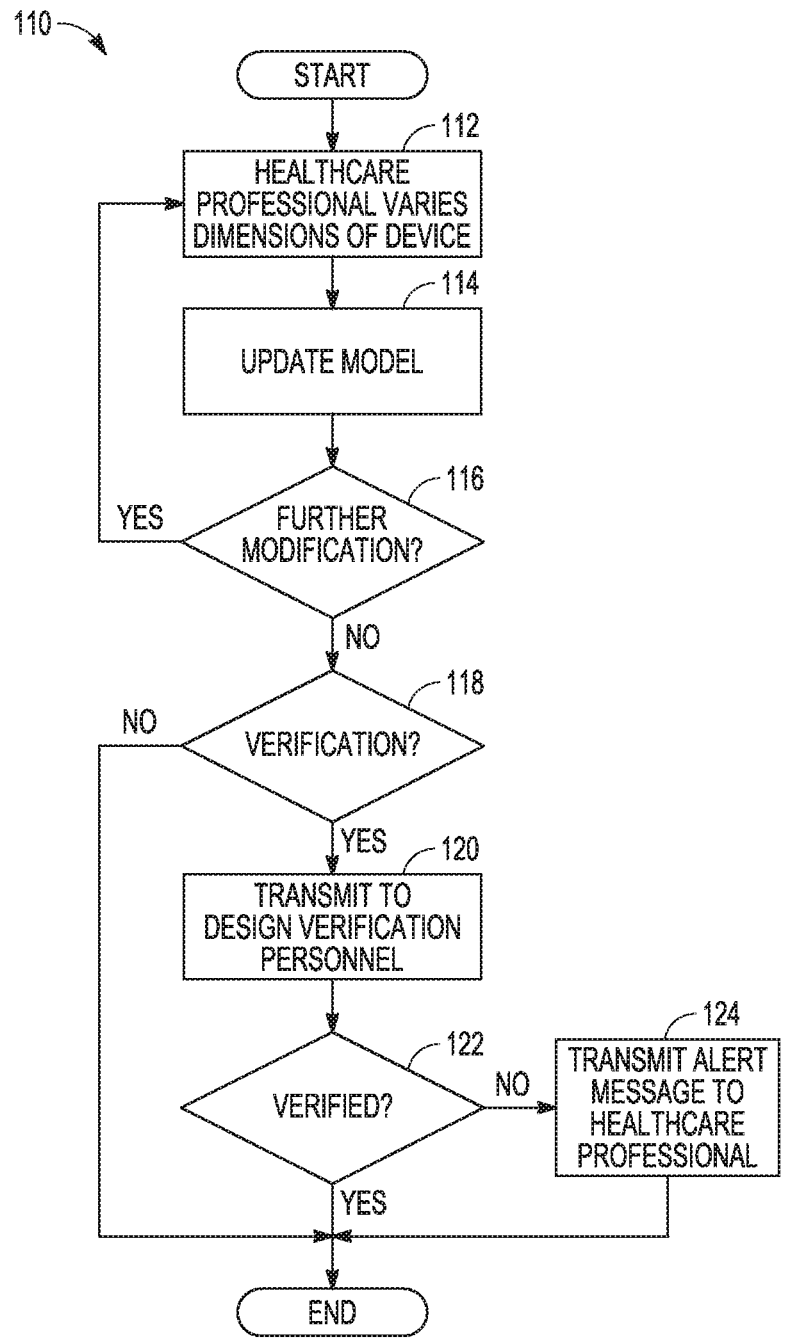
FIG. 5 is a flowchart showing processing steps carried out by the system for allowing a healthcare professional to customize a device prior to fabrication of same.

FIG. 5 is a flowchart showing, in greater detail, processing steps 110 carried out by the system for allowing a healthcare professional to customize a device for fabrication. In step 112, a model of the device is displayed to the healthcare professional (e.g., as shown in FIG. 3D), and the healthcare professional varies one or more parameters of the device, such as dimensions, materials, etc. Then, in step 114, once the parameters have been entered, the model is updated. In step 116, a determination is made as to whether further modification of the device is desired. If so, control returns to step 112; otherwise, control passes to step 118.

In step 118, a determination is made as to whether verification of the updated design is required. If not, processing shown in FIG. 5 ends. Otherwise, step 120 occurs, wherein the updated design is transmitted to personnel (e.g., engineering personnel, quality control personnel, etc.). Then, in step 122, a determination is made as to whether the updated design is verified. If so, processing in FIG. 5 ends. Otherwise, step 124 occurs, wherein the system transmits an alert to the healthcare professional indicating that the updated design is not suitable for manufacturing. In such circumstances, the healthcare professional can change the design using the system, if desired.

Figure 6:
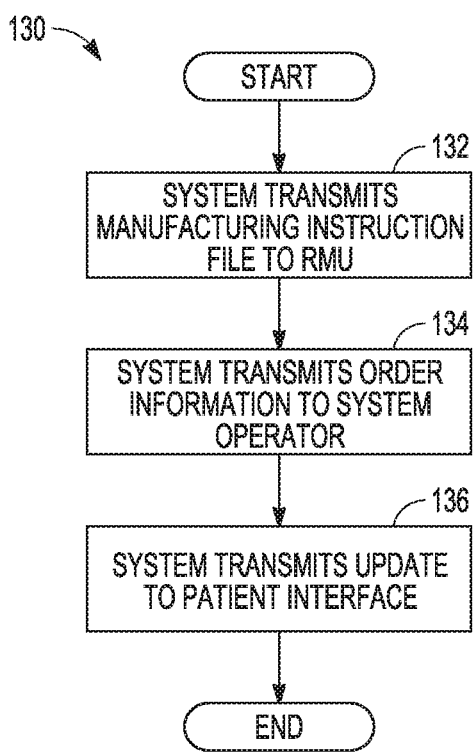
FIG. 6 is a flowchart illustrating processing steps carried out by the system for transmitting instruction files for fabricating a medical device to the remote manufacturing unit of the system, and for processing same at the remote fabrication unit.

FIG. 6 is a flowchart showing processing steps 130 carried out by the system for processing of device manufacturing orders by the RMU. In step 132, the system transmits a device manufacturing instruction file to the RMU. Then, in step 134, the system transmits order information to an operator of the system for, e.g., recordkeeping, billing, and/or other purposes. In step 136, the system transmits an update to a patient interface (e.g., a web-based or app-based interface running on a computer system in communication with the system 10, such as the smart phones 26 of FIG. 1), so that the patient can monitor the status of fabrication of a medical device.

Figure 7:
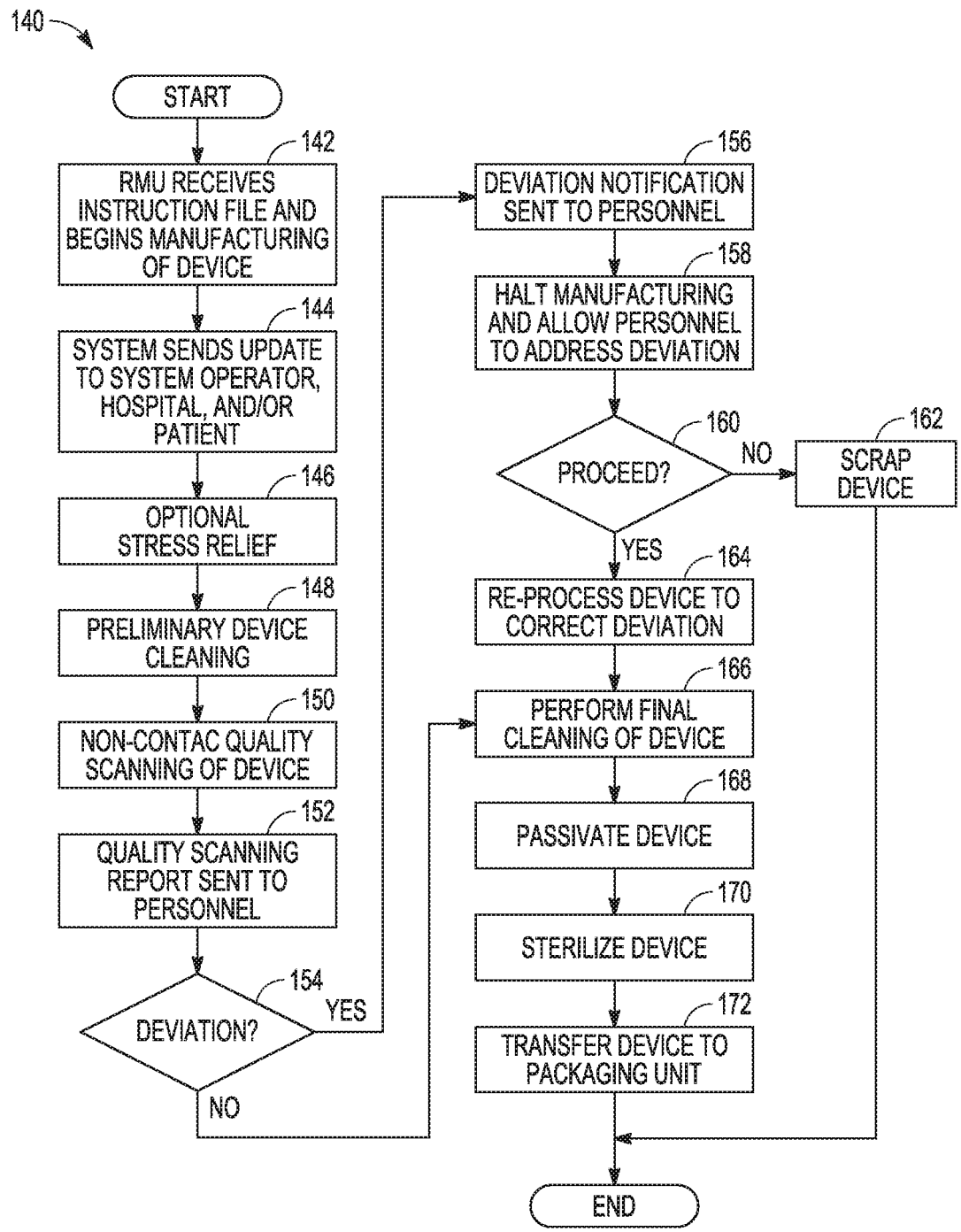
FIG. 7 is a flowchart showing additional processing steps carried out by the system for manufacturing a medical device at a medical facility.

FIG. 7 is a flowchart showing additional processing steps 140 carried out by the system for manufacturing a medical device at a facility, such as a medical facility. In step 142, the RMU receives a digital instruction file containing instructions regarding fabrication of a medical device, and then begins manufacturing of the device. As discussed above, the device could be manufacture by the RMU using any suitable manufacturing technique, including, but not limited to, additive manufacturing, subtractive manufacturing, 3D printing, etc. In step 144, when manufacturing of the device has been initiated, the system sends an update to a system operator, hospital personnel, and/or the patient, advising that the manufacturing process has begun. In step 146, after the RMU fabricates the device, an optional stress relief test could be conducted by the RMU on the device. In step 148, the device undergoes a preliminary cleaning by the RMU to remove debris from the device. Then, in step 150, the RMU scans the device to ascertain that it complies with pre-defined quality control standards. This could be accomplished using laser scanning or other type of non-contact scanning of the device.

In step 152, the RMU transmits a quality scanning report to the central control system 20. Then, in step 154, the RMU determines whether the manufactured device deviates from pre-defined quality control standards. If a positive determination is made, step 156 occurs, wherein a deviation notification is transmitted to the central control system 20 for review by one or more personnel (e.g., engineering staff, quality control personnel, etc.) Otherwise, steps 166-172, discussed below, occur.

In step 158, the RMU halts manufacturing of the device, and the aforementioned personnel are allowed to review the deviation notification. In step 160, a determination is made as to whether the deviation is tolerable and/or can be rectified using additional manufacturing steps. If a negative determination is made, step 162 occurs, wherein the device is scrapped (e.g., it could be thrown away entirely by the RMU, or its materials could be recycled by the RMU for future use by the system). If a positive determination is made, step 164 occurs, wherein the RMU re-processes the device to correct the deviation. This step could be carried out by the RMU itself, or using other devices such as milling machines, lathe machines, grinding machines, etc., any of which could be in communication with and/or controlled by the RMU. Next, in step 166, once the device has been successfully re-processed, a final cleaning of the device is performed by the RMU. Then, in step 170, the RMU sterilizes the device using any suitable sterilization technique such as ultraviolet, steam, hydrogen peroxide, ethylene oxide (ETO) or other sterilization technique. Finally, once the device has been successfully sterilized, it is transferred to the packaging unit (subsystem) 38 of the RMU, for packaging of the device.

Figure 8:
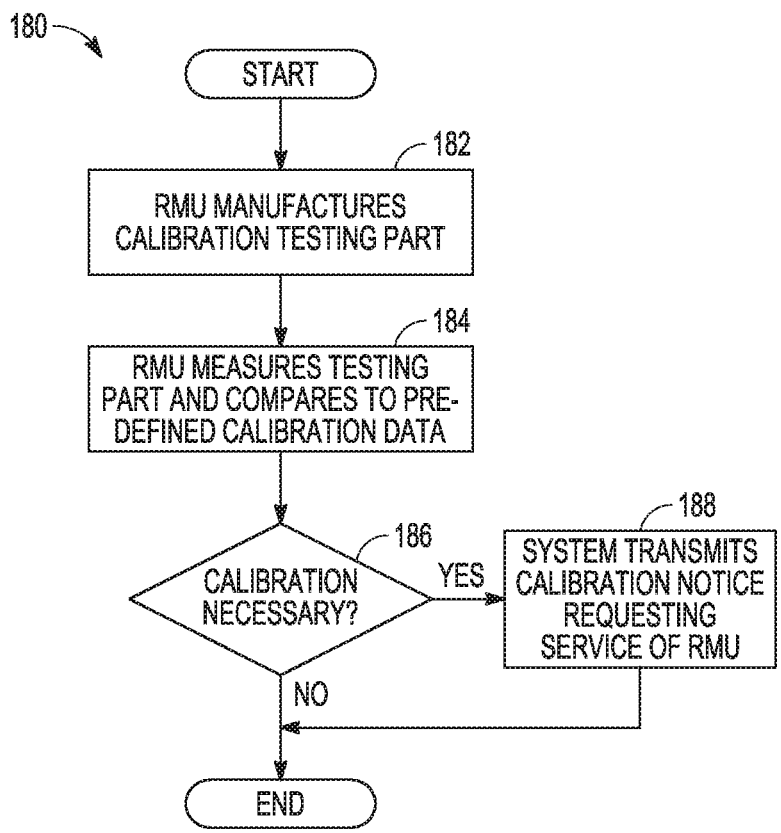
FIG. 8 is a flowchart showing processing steps carried out by the system for periodic calibration of the remote manufacturing unit of the system.

FIG. 8 is a flowchart showing processing steps 180 carried out by the system for periodic calibration of the remote manufacturing unit of the system. Periodic calibration of the RMU is performed to ensure that the RMU is appropriately calibrated and continues to function within acceptable parameters. In step 182, the RMU manufactures a calibration testing part, such as a sample medical device that will only be used by the RMU for calibration purposes. Then, in step 184, the RMU measures the testing part and compares the measurement data to pre-defined calibration data. In step 186, a determination is made as to whether calibration is necessary. If so, step 188 occurs, wherein the system transmits a calibration notice to repair/maintenance personnel, requesting servicing/calibration of the RMU.

Figure 9:
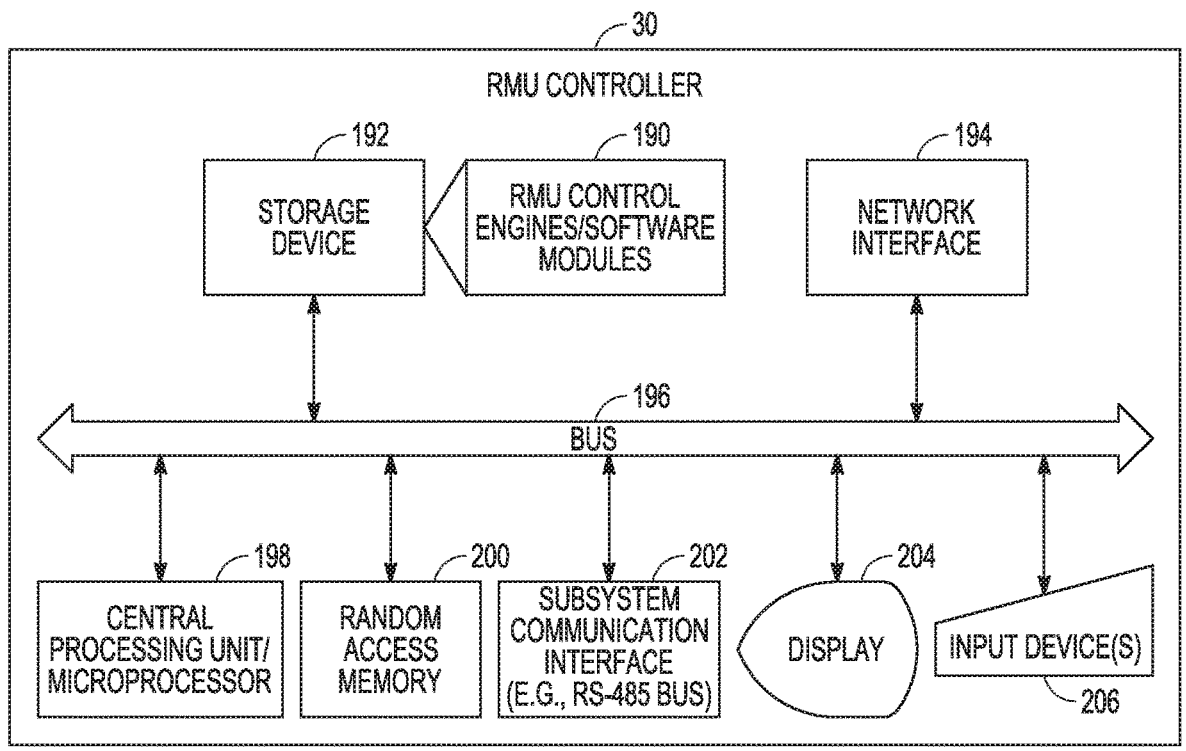
FIG. 9 is a diagram illustrating hardware and software components of the remote manufacturing unit controller of the system.

FIG. 9 is a diagram illustrating hardware and software components of the remote manufacturing unit controller 30 of the system. The processing steps carried out by the RMU and discussed above could be embodied as one or more control engines/software modules 190 that are stored in a non-volatile storage device 192 of the controller 30 (including, but not limited to, disk memory, flash memory, read-only memory (ROM), or other type of non-volatile memory) and executed by a central processing unit/microprocessor 198 of the controller 30. A network interface 194 is provided for allowing the controller to communicate with one or more external devices (e.g., one or more of the components/devices discussed above in connection with FIGS. 1-2). An internal bus 196 allows for inter-communication between the components of the controller 30 shown in FIG. 9. Also provided in the controller 30 is a random-access memory (RAM) 200, a subsystem communication interface 202 (for allowing communication with an external controller bus, such as an RS-485 bus), a display 204, and one or more input devices 206 (e.g., keyboard, touchscreen, mouse, trackball, track pad, etc.).

Figure 10:
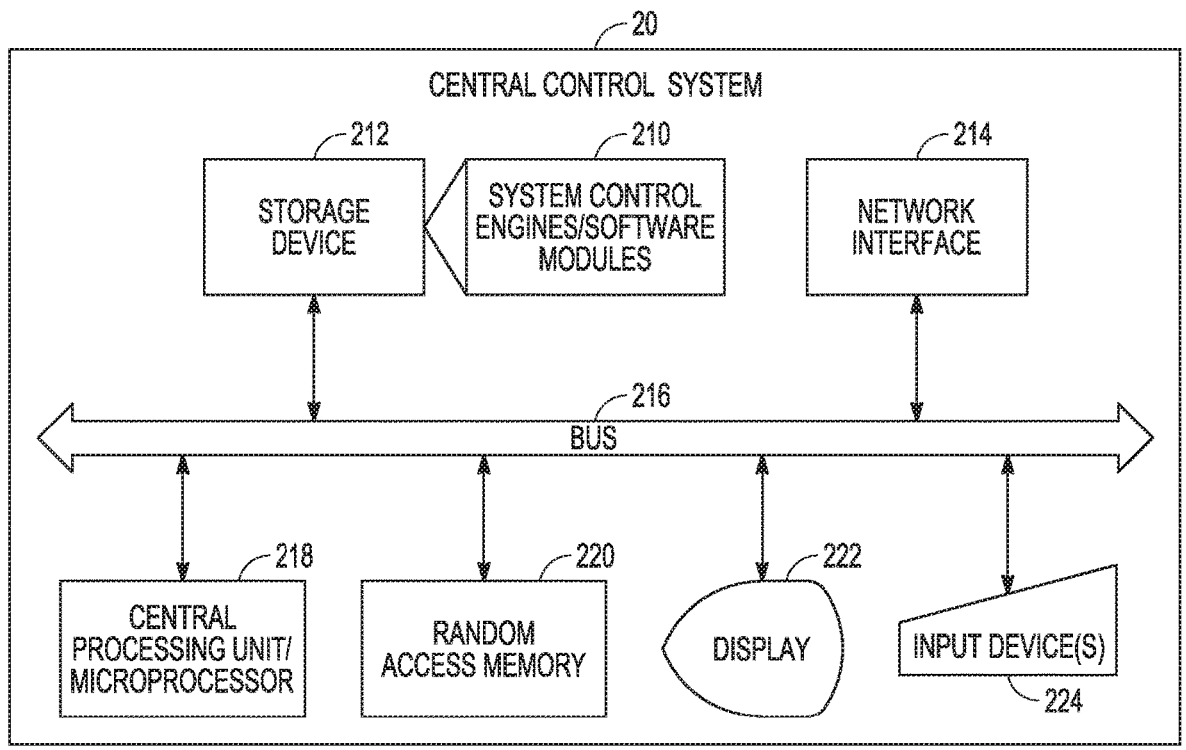
FIG. 10 is a diagram illustrating hardware and software components of the central control system of FIG. 1.

FIG. 10 is a diagram illustrating hardware and software components of the central control system 20 of the system. The processing steps carried out by the central control system 20 and discussed above could be embodied as one or more control engines/software modules 210 that are stored in a non-volatile storage device 212 of the control system 20 (including, but not limited to, disk memory, flash memory, read-only memory (ROM), or other type of non-volatile memory) and executed by a central processing unit/microprocessor 218 of the control system 20. A network interface 214 is provided for allowing the control system 20 to communicate with one or more external devices (e.g., one or more of the components/devices discussed above in connection with FIG. 1). An internal bus 216 allows for inter-communication between the components of the control system 20 shown in FIG. 10. Also provided in the control system 20 is a random-access memory (RAM) 220, a display 204, and one or more input devices 206 (e.g., keyboard, touch-screen, mouse, trackball, track pad, etc.).

Figure 11:
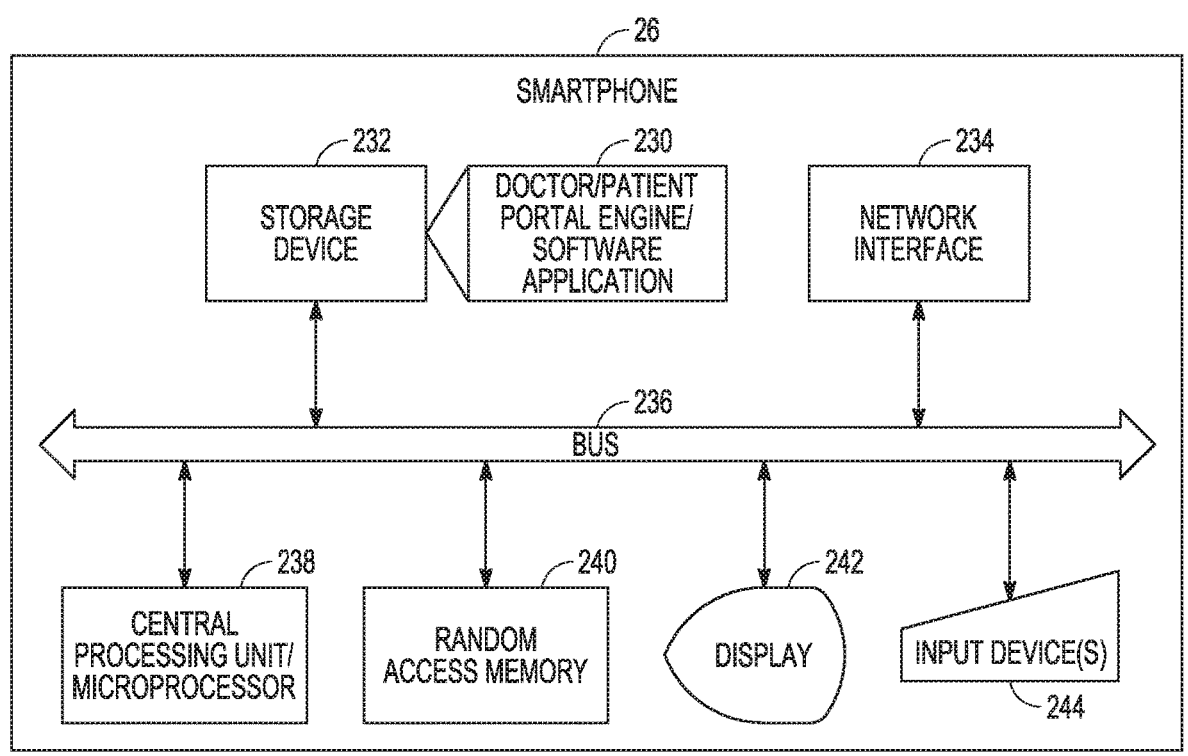
FIG. 11 is a diagram illustrating hardware and software components of a smartphone programmed in accordance with the present disclosure.

FIG. 11 is a diagram illustrating hardware and software components of one of the smart phones 26 of FIG. 1. The processing steps carried out by the smart phone 26 and discussed above could be embodied as one or more doctor/patient portal engines/software applications that are stored in a non-volatile storage device 232 of the smart phone 26 (including, but not limited to, disk memory, flash memory, read-only memory (ROM), or other type of non-volatile memory) and executed by a central processing unit/microprocessor 238 of the smart phone 26. A network interface 234 is provided for allowing the smart phone 26 to communicate with one or more external devices (e.g., one or more of the components/devices discussed above in connection with FIG. 1). An internal bus 236 allows for inter-communication between the components of the smart phone 26 shown in FIG. 11. Also provided in the smart phone 26 is a random-access memory (RAM) 240, a display 242, and one or more input devices 244 (e.g., touch-screen, etc.).

It is noted that the RMU of the system could be augmented to include one or more subsystems for recycling of used medical devices previously fabricated by the RMU, thereby saving materials costs and reducing waste. In such circumstances, the RMU would include the ability to process such materials (e.g., by way of mechanical grinding, melting, etc.) and to remove biohazards from such materials, prior to re-usage of the materials to fabricate new devices. Also, it is contemplated that the RMU of the system includes the ability to monitor the supply of raw materials presently available to the RMU for device manufacturing purposes, and to generate and transmit periodic requests to replenish such materials.

As can be appreciated from the foregoing discussion, the system of the present invention provides a flexible, distributed platform for allowing medical devices to be rapidly manufactured at facilities in response to remote and/or local requests for such devices, e.g., over the Internet using one or more of the computing devices discussed above and/or at a facility using a kiosk-type computing device. Further, while mention has been made above in connection with manufacturing being conducted at medical facilities, it is to be understood that the system of the present invention could be implemented to remotely manufacture devices at other locations, such as at regional and/or remote manufacturing sites, and/or at locations to which RMV could be shipped and set up for operation.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by Letters Patent is set forth in the appended claims.

What is claimed is:

1. A system for manufacturing medical devices, comprising:
    a manufacturing unit installed at a medical facility having an operating room for performing a medical procedure, the manufacturing unit including:
        a manufacturing subsystem for manufacturing medical devices;
        a finishing subsystem for finishing medical devices manufactured by the manufacturing subsystem; and
        a controller for controlling the manufacturing subsystem and the finishing subsystem;
    at least one computer system in communication with the manufacturing unit, the at least one computer system comprising a processor and a memory device, the memory device including instructions that, when executed by the processor, perform operations including:
        presenting a healthcare professional with a digital catalog of medical devices, allowing the healthcare professional to select a desired device from the digital catalog of medical devices for use during an operation in the operating room, and
        transmitting instructions for manufacturing the selected device to the manufacturing unit at the medical facility, for subsequent manufacturing of the selected device by the manufacturing unit;
        wherein the at least one computer system comprises a kiosk-type computer installed at the medical facility at a location within the medical facility remote from the manufacturing unit; and
    a central control system in communication with the at least one computer system and the manufacturing unit at a location remote from the medical facility;
        wherein the central control system remotely controls manufacturing processes carried out by the manufacturing unit.

2. The system of claim 1, wherein the manufacturing subsystem of the manufacturing unit fabricates the desired medical device using at least one of a three-dimensional printer, an additive manufacturing technique and a subtractive manufacturing technique.

3. The system of claim 1, wherein the finishing subsystem comprises a cleaning subsystem for cleaning devices manufactured by the manufacturing unit.

4. The system of claim 1, wherein the finishing subsystem comprises a sterilization subsystem for sterilizing devices manufactured by the manufacturing unit.

5. The system of claim 1, wherein the finishing subsystem comprises a packaging subsystem for packaging devices manufactured by the manufacturing unit.

6. The system of claim 1, wherein the finishing subsystem comprises a robot integration subsystem.

7. The system of claim 1, wherein the finishing subsystem comprises an inspection subsystem for inspecting devices manufactured by the manufacturing unit.

8. The system of claim 1, wherein the manufacturing unit recycles used medical devices for use in manufacturing future medical devices.

9. The system of claim 1, wherein the finishing subsystem comprises:
a packaging subsystem for packaging devices manufactured by the manufacturing subsystem after sterilizing; and
a delivery system for delivering a packaged medical device to a hospital materials distribution system within the medical facility.

10. The system of claim 1, wherein the manufacturing subsystem, the finishing subsystem and the controller are located in a single common housing.

11. The system of claim 1, wherein the at least one computer system is in communication with a hospital information management system of the medical facility.

12. The system of claim 1, wherein the memory device includes further instructions that, when executed by the processor, perform further operations including:
presenting a healthcare professional with a digital catalog of medical devices, allowing the healthcare professional to select a desired device from the digital catalog of medical devices,
presenting the healthcare professional with a model of the desired device and allowing the healthcare professional to customize the desired device prior to manufacturing of the device, and
transmitting instructions for manufacturing a customized device to the manufacturing unit at the medical facility, for subsequent manufacturing of the customized device by the manufacturing unit.

13. A system for manufacturing medical devices, comprising:
a manufacturing unit installed at a medical facility, the manufacturing unit including:
a manufacturing subsystem for manufacturing medical devices;
a first finishing subsystem for performing a first finishing procedure on medical devices manufactured by the manufacturing subsystem;
a second finishing subsystem for performing a second finishing procedure on medical devices manufactured by the manufacturing subsystem;
a robot subsystem for moving manufactured medical devices between the manufacturing subsystem, the first finishing system and the second finishing system;
a controller for controlling the manufacturing subsystem and the first and second finishing subsystems;
a packaging subsystem for packaging devices manufactured by the manufacturing subsystem after sterilizing, wherein the packaging subsystem includes a delivery system for delivering a packaged medical device to a hospital materials distribution system within the medical facility; and
at least one computer system in communication with the manufacturing unit, the at least one computer system configured to allow a healthcare professional to input a desired medical device for manufacturing, and configured to transmit instructions for manufacturing the desired medical device to the manufacturing unit at the medical facility, for subsequent manufacturing of the desired medical device by the manufacturing unit.

14. The system of claim 13, wherein:
the first finishing subsystem comprises an inspection subsystem for inspecting devices manufactured by the manufacturing unit; and
the second finishing subsystem comprises a sterilizing subsystem for sterilizing devices manufactured by the manufacturing unit.

15. The system of claim 14, wherein the inspection subsystem comprises a non-contact scanning device.

16. The system of claim 14, wherein the sterilizing subsystem includes at least one of an ultraviolet sterilizing system, a steam sterilizing system, a hydrogen peroxide sterilizing system and an ethylene oxide sterilizing system.

17. The system of claim 14, further comprising a cleaning subsystem for cleaning devices manufactured by the manufacturing unit before inspection.

18. The system of claim 14, further comprising a scrapping subsystem for recycling devices after inspection.

19. The system of claim 18, wherein the scrapping subsystem includes a mechanical grinding system or a melting system.

20. A system for manufacturing medical devices, comprising:
a first manufacturing unit installed at a first medical facility, the first manufacturing unit including:
a manufacturing subsystem for manufacturing medical devices;
a finishing subsystem for finishing medical devices manufactured by the manufacturing subsystem; and
a controller for controlling the manufacturing subsystem and the finishing subsystem;
wherein the manufacturing subsystem, the finishing subsystem and the controller are located in a single common housing;
at least one computer system installed at the first medical facility at a location in the first medical facility different than the first manufacturing unit so as to be in communication with the first manufacturing unit and a hospital information management system of the first medical facility, the at least one computer system comprising a processor and a memory device, the memory device including instructions that, when executed by the processor, perform operations including:
presenting a healthcare professional with a digital catalog of medical devices, allowing the healthcare professional to select a desired device from the digital catalog of medical devices,
presenting the healthcare professional with a model of the desired device and allowing the healthcare professional to customize the desired device prior to manufacturing of the device, and transmitting instructions for manufacturing a customized device to the manufacturing unit at the first medical facility, for subsequent manufacturing of the customized device by the first manufacturing unit; and a central control system installed remotely from the medical facility so as to be discrete from and in communication with both the at least one computer system and the first manufacturing unit, wherein the central control system supplies a plurality of product designs for viewing at the at least one computer system.

21. The system of claim 20, further comprising a second manufacturing unit installed at a second medical facility, the second manufacturing unit in communication with the central control system.

* * * * *